(12) United States Patent
Lyschick et al.

(10) Patent No.: US 7,745,969 B2
(45) Date of Patent: Jun. 29, 2010

(54) ELECTRICAL MACHINE WITH AN END-SIDE DEFLECTION OF ELECTRICAL CONDUCTORS

(75) Inventors: Eduard Lyschick, Bad Neustadt (DE); Fridolin Mahlmeister, Münnerstadt (DE); Michael Menz, Hohenroth (DE); Norbert Wöhner, Heustreu (DE)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 12/063,296

(22) PCT Filed: Aug. 2, 2006

(86) PCT No.: PCT/EP2006/064968
§ 371 (c)(1),
(2), (4) Date: Feb. 8, 2008

(87) PCT Pub. No.: WO2007/017442
PCT Pub. Date: Feb. 15, 2007

(65) Prior Publication Data
US 2009/0127968 A1      May 21, 2009

(30) Foreign Application Priority Data
Aug. 8, 2005   (DE) .................. 10 2005 037 373

(51) Int. Cl.
*H02K 3/46* (2006.01)
*H02K 3/48* (2006.01)
*H02K 15/085* (2006.01)

(52) U.S. Cl. ............. 310/260; 310/214; 242/432.6

(58) Field of Classification Search ........... 310/214, 310/43, 254; 242/157 R, 432, 433.4, 432.6
See application file for complete search history.

(56) References Cited

U.S. PATENT DOCUMENTS

| | | | |
|---|---|---|---|
| 3,281,084 A * | 10/1966 | Lill | ............ 242/432.6 |
| 3,768,152 A | 10/1973 | Leonard | |
| 4,563,606 A | 1/1986 | Fukasawa | |
| 5,394,046 A * | 2/1995 | Dolgas | ........ 310/216.002 |
| 5,664,317 A * | 9/1997 | Ponzio et al. | ........ 29/596 |
| 5,717,273 A | 2/1998 | Gulbrandson | |

FOREIGN PATENT DOCUMENTS

| | | |
|---|---|---|
| CH | 493 137 A | 6/1970 |
| DE | 43 37 870 C2 | 8/1995 |
| FR | 2 778 284 A1 | 11/1999 |
| GB | 2 310 766 A | 9/1997 |

* cited by examiner

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

An electrical machine includes a basic bed having a opposite axial end sides and slots, wherein the slots an the end sides have each a slot end opening. A winding system has electrical conductors which are accommodated in the slots wherein the electrical conductors extend out on one of the end sides of at least one of the slot end openings. The electrical conductors are hereby laid within a bridging region extending in a circumferential direction on the at least one end side and are inserted into at least one other one of the slot end openings. Arranged on the at least one end side in the bridging region is a first guide element for guiding the electrical conductors of a first subwinding of the windings stem. An end late is arranged on the at least one end side and has at least one axially protruding separating element with the first guide element having a base bearing a against the separating element.

9 Claims, 4 Drawing Sheets

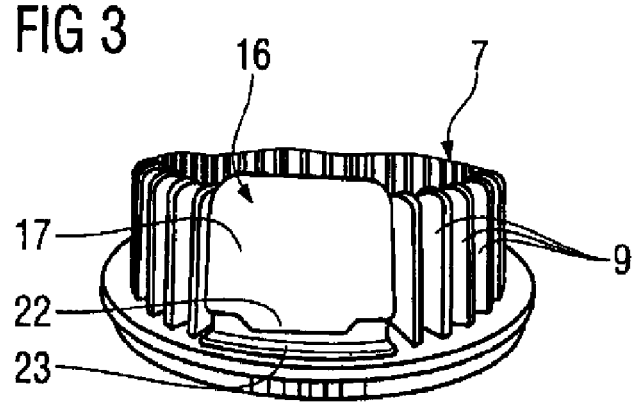
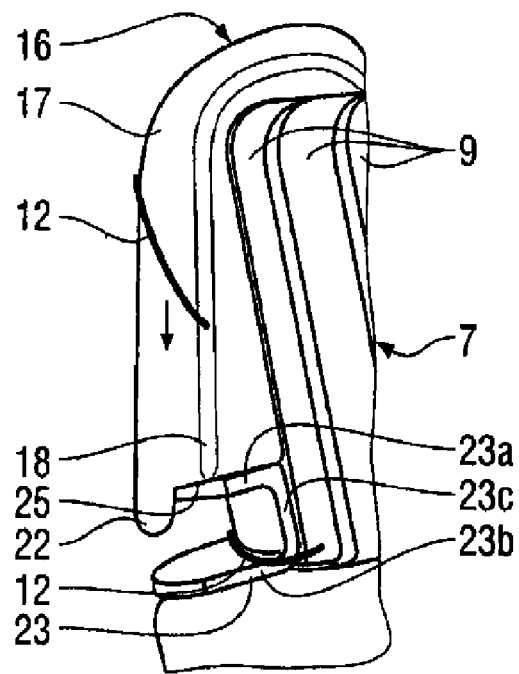
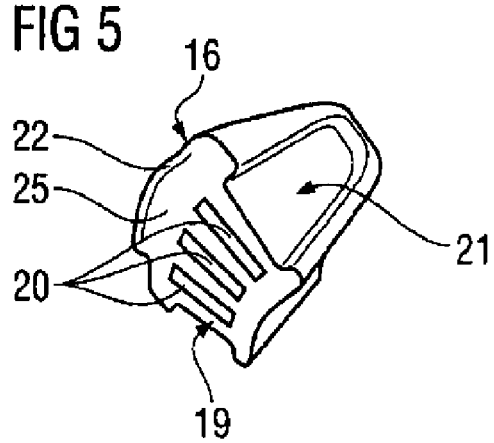

ELECTRICAL MACHINE WITH AN END-SIDE DEFLECTION OF ELECTRICAL CONDUCTORS

BACKGROUND OF THE INVENTION

The invention relates to an electrical machine with an axis of rotation and a basic body, which contains two axial end sides and slots for accommodating electrical conductors of a winding system.

Such an electrical machine is in the form of an electric motor, for example. In order to manufacture the winding system, the basic body, which is in particular in the form of a stator or a stator laminate stack, has recently been wound with a so-called needle winder, a winding nozzle of the needle winder laying an electrical conductor in the interior of a stator bore into one of the slots and progressing in the axial direction, i.e. in the direction of the axis of rotation. The winding nozzle (=needle) is first moved a bit further outwards in the axial direction at the end side. Then, the stator laminate stack is rotated about the axis of rotation until the slot end opening of that slot appears at the level of the winding nozzle at which the electrical conductor is guided back in the opposite direction within the stator bore. The process takes place in mirror-image fashion on the opposite end side. This is repeated corresponding to the desired turns number, so that winding heads form at the two end sides.

The winding system can comprise a plurality of subwindings, which are introduced into the stator laminate stack successively with the described method. In this case, the deflection path length at the end sides when the subwindings are subsequently introduced is greater than when the subwindings are first produced. As a result, the mean coil lengths of the individual subwindings differ from one another. In addition, the amount of material used when the subwindings are introduced subsequently increases, as a result of which the individual subwindings may also have differences as regards their electrical resistance.

SUMMARY OF THE INVENTION

The object of the invention therefore consists in specifying an electrical machine of the type mentioned at the outset which has a high-quality winding system.

This object is achieved according to the invention by an electrical machine in which
a) the slots on the end sides each have a slot end opening,
b) the electrical conductors on one of the end sides,
  b1) are passed out of at least one of the slot end openings,
  b2) are laid within a bridging region running in the circumferential direction on the end side, and
  b3) are inserted into at least one other one of the slot end openings,
c) a first guide element for guiding the electrical conductors of a first subwinding of the winding system is arranged on the end side in the bridging region, and
d) an end plate with at least one axially protruding separating element is arranged on the end side and the first guide element bears against the separating element with a base.

The guide element used according to the invention permits very uniform and controlled winding even at the end side. In addition, effective utilization of space primarily also in the radial direction is achieved, so that a shorter axial extent in comparison with the known electrical machines also results.

The use of the guide element makes it possible to arrange the individual layers of the electrical conductors in a controlled manner, so that the winding head at the end side can be configured in a defined manner. In particular, successively produced subwindings with substantially identical turn lengths and subsequently identical electrical resistances can also be realized in this way.

Overall, the use according to the invention of the guide element therefore results in a very precise and high-quality winding. In particular, a reduction in the mean coil length is achieved in comparison with a winding without the guide element. This results in an improvement in the electrical operational data of the electrical machine with reduced use of material at the same time.

As a result of the first guide element bearing against the end side of the end plate, the guide element is secured in position and, as a consequence of this, a high degree of manufacturing accuracy is achieved. In particular, the electrical insulation between the electrical conductors of adjacent subwindings or between the electrical conductors and the basic body is ensured owing to the guide element which is fixed in position.

A favorable variant is one in which an end plate with at least one axially protruding separating element is arranged on the end side, and the first guide element bears with a base against the separating element. As a result, the guide element is secured in position and, as a consequence of this, a high degree of manufacturing accuracy is achieved. In particular, the electrical insulation between the electrical conductors of adjacent subwindings or between the electrical conductors and the basic body is ensured owing to the guide element which is fixed in position.

In further preferred configurations, the first guide element has a U or an L profile. As a result, particularly effective guidance of the electrical conductors is achieved.

Preferably, the first guide element can furthermore run in the circumferential direction and have the shape of a circular arc segment. In this case, it is matched particularly well to the generally cylindrical geometry of the basic body and to the bridging region, which is likewise in the form of a circular arc segment.

Furthermore, it is advantageous if a further guide element for guiding the electrical conductors of a further subwinding of the winding system is arranged axially adjacent to the first guide element. In this way, a plurality of subwindings can also be controlled and manufactured precisely and arranged in particular at the end sides in a very space-saving manner next to one another.

Preferably, the guide elements are then in addition designed to be stackable, so that a tightly adjacent and therefore space-saving arrangement is possible.

It is furthermore preferred that the first guide element has a limb and a base, which abut one another at a bending edge, and a cutout runs along the bending edge in an outer region facing away from the electrical conductors. A base of a further, in particular L-profiled guide element can be inserted into the cutout and thereby fixed in position. This favorable insertion one inside the other in addition also reduces the axial extent.

Another favorable configuration is characterized by the fact that the first guide element is designed to be electrically insulating. This increases the electrical safety and also the functional reliability of the electrical machine overall. In particular, the electrical insulation with respect to the basic body is also ensured when no electrically insulating end plate is used.

It is furthermore preferred that the first guide element is made from a plastic material. It can then be produced easily, for example by means of a conventional injection-molding process. In addition, many plastic materials meet the requirements for the electrical insulation capability.

Further features, advantages and details of the invention are given in the description below relating to exemplary embodiments with reference to the drawing, in which:

BRIEF DESCRIPTION OF THE DRAWING

FIGS. 3 and 4 show an exemplary embodiment of a guide element and an auxiliary winding body which is positioned on the end plate shown in FIG. 1 during a winding process, FIG. 5 shows the auxiliary winding body, which has fastening apertures on its underside, as shown in FIGS. 3 and 4.

DETAILED DESCRIPTION OF PREFERRED EMBODIMENTS

Mutually corresponding parts are provided with the same reference symbols in FIGS. 1 to 12.

Figure 1:
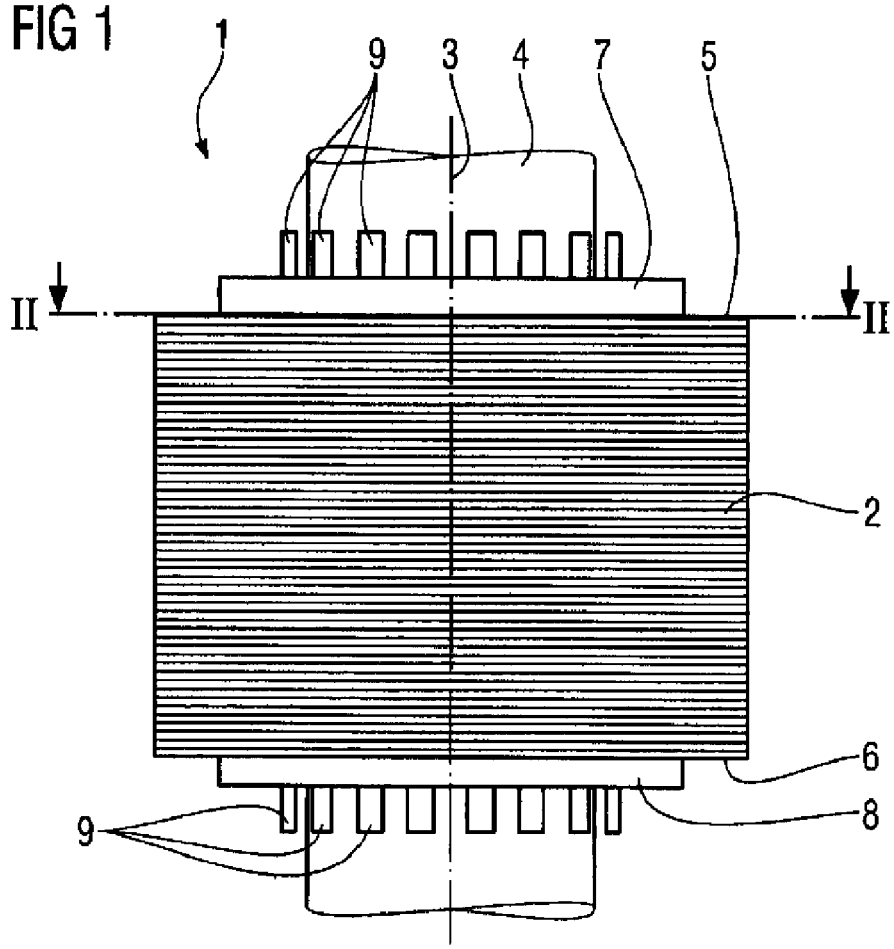
FIG. 1 shows an exemplary embodiment of a basic body to be wound of an electrical machine with end plates arranged at the end sides, in a plan view.

FIG. 1 illustrates an exemplary embodiment of an electrical machine 1 in the form of an electric motor with a basic body 2 to be wound and a rotor 4, which is mounted such that it is capable of rotating about an axis of rotation 3. The basic body 2 belongs to a stator of the electrical machine 1 and is in the form of a stator laminate stack. It has axial end sides 5 and 6, on which in each case one electrically insulating end plate 7 and 8, respectively, is arranged. The end plates 7 and 8 have axially protruding separating webs 9, which are arranged so as to be uniformly distributed in the circumferential direction.

Figure 2:
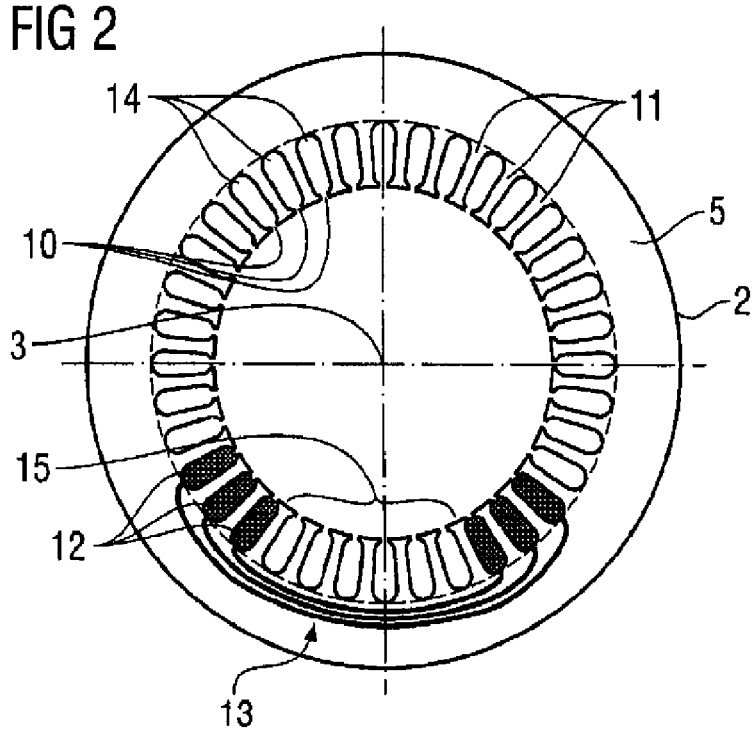
FIG. 2 shows the basic body shown in FIG. 1 in a cross-sectional illustration.

As shown in the cross-sectional illustration in FIG. 2, the basic body 2 has a stator inner bore, in which the rotor 4, which is not illustrated in FIG. 2, is placed. Axially running slots 10, which are distributed uniformly over the circumference, are provided in the basic body 2 adjacent to an inner wall of this stator inner bore. If appropriate, the slot profile can have a slight incline deviating from the precisely axial direction. Slot webs 11 are arranged between the slots 10.

The insulating end plates 7 and 8 are arranged on the end sides 5 and 6, respectively, in such a way that their separating webs 9 are aligned with the slot webs 11. The number of separating webs 9 and slot webs 11 is the same.

Electrical conductors 12 of an electrical winding system 13 to be introduced into the basic body 2 are placed within the slots 10. In the exemplary embodiment shown in FIG. 2, the basic body is shown in a partially wound state. Electrical conductors 12 are arranged only in some of the slots 10. At the end sides 5 and 6, the slots 10 have slot end openings 14, from which the electrical conductors 12 protrude in order to be deflected outside the basic body 2 at the end sides 5 and 6 and be guided to another one of the slots 10. This deflection and guidance of the electrical conductors 12 takes place in the exemplary embodiment shown in FIGS. 1 and 2 by means of the insulating end plates 7 and 8. In FIG. 2, this deflection and conductor guidance is indicated schematically.

The end plates 7 and 8 can be used universally. They can be used to realize winding systems 13 for various pole numbers. When winding the basic body 2 and also the end plates 7 and 8 with the electrical conductors 12, high tensile stresses and a high degree of friction between the separating webs 9 and the electrical conductors 12 can arise.

This may firstly lead to bending of and/or damage to the separating webs and secondly to damage to the electrical conductors, for example their electrical insulation.

In order to prevent these disadvantageous effects during the winding process, the separating webs 9 are covered in a bridging region 15 by means of an auxiliary winding body 16 shown in FIGS. 3 to 6 and are therefore protected. The auxiliary winding body 16 is in the form of a winding shoe and has the shape of a circular arc segment. Its outer wall 17 is smooth and has rounded-off outer wall edges 18. It has a rounded-off surface contour and, in the exemplary embodiment, is produced from aluminum.

When winding the basic body 2, the deflection and guidance of the electrical conductors 12 no longer takes place by means of the separating webs 9 of the end plates 7 or 8, but by means of the auxiliary winding body 16. In order to produce a subwinding with a plurality of turns, in each case one auxiliary winding body 16 is arranged on one of the two end sides 5 and 6 in such a way that it covers the slot end openings 14 which are not to be wound during this subwinding process within the bridging region 15 running in the circumferential direction. The electrical conductor 12 is inserted into one of the slots 10, whose slot end opening 14 lies on a side of the bridging region 15 which points in the circumferential direction, and is guided out through the associated uncovered slot end opening 14. Then, it is deflected at the relevant end side 5 or 6 by means of the auxiliary winding body 16 and guided to a further uncovered one of the slot end openings 14, which lies on the other side of the bridging region 15 which points in the circumferential direction, in order to be inserted into the associated slot 10 there and to be guided to the other end side 6 or 5. There, the process is repeated in mirror-image fashion, so that a complete turn is produced. Depending on the turns number envisaged, this process described for one turn is repeated. Once this subwinding process has come to an end, the auxiliary winding bodies 16 which have been arranged in auxiliary fashion on both end sides 5 and 6, are removed again. The described winding operation can be carried out in particular automatically by means of a needle winder.

Fastening apertures 20 are provided on an underside 19 of the auxiliary winding body 16 and reach into the auxiliary winding body 16 starting from the underside 19. The fastening apertures 20 are used for accommodating the separating webs 9. Even on its two side cheeks pointing in the circumferential direction, the auxiliary winding body 16 has in each case one lateral aperture 21, by means of which in each case one of the two separating webs 9, which are arranged at the edge of the bridging region 15, is held and protected.

Figure 6:
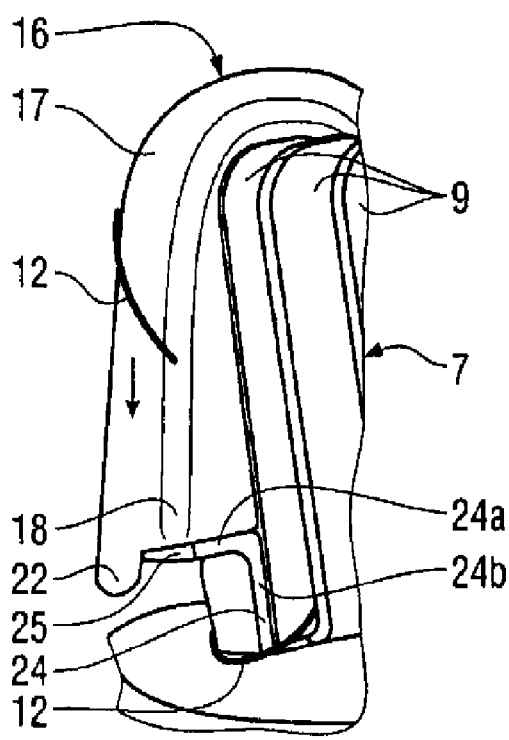
FIG. 6 shows an exemplary embodiment of a further guide element, which is used in conjunction with the auxiliary winding body shown in FIGS. 3 to 5.

The outer wall 17 has a projection 22, which reaches beyond the underside 19 and does not extend over the entire circular arc segment in the circumferential direction, which circular arc segment is covered by the remaining auxiliary winding body 16. The projection 22 acts in the same way as the smooth outer wall 17 for targeted guidance of the electrical conductors 12. The electrical conductor 12 which is just to be introduced is guided, in combination with the deflection in the outer region of the basic body 2, over the smooth outer wall 17 of the auxiliary winding body 16 and, as indicated in FIGS. 4 and 6 by the directional arrows, is drawn downwards. The projection 22, which is provided at the end in this movement direction, allows the electrical conductor 12 to slide into a U-profiled guide element 23 (FIGS. 3 and 4) or L-profiled guide element 24 (FIG. 6), which guide element 23 or 24 is arranged between the auxiliary winding body 16 and the end plate 7, in a targeted manner. The U-profiled guide element 23 has two U limbs 23a and 23b and a U base 23c. The L-profiled guide element 24 has an L limb 24a and an L base 24b. Both guide elements 23 and 24 are also designed to be in the form of circular arcs. In the state shown in FIGS. 4 and 6, in each case one turn of the electrical conductor 12 is already located in the respectively associated guide element 23 or 24, while the next turn is being produced, the electrical conductor 12 being guided along the smooth outer wall 17 of the auxiliary winding body 16.

A bearing face 25 for the guide element 23 or 24 is provided adjacent to the projection 22 on the underside 19 of the auxiliary winding body 16. By means of the bearing face 25, the guide element 23 and 24 is fixed in its position in such a way that it does not experience any undesirable shift in position during the winding process. The guide elements 23 and 24 have an electrically insulating function which, owing to this advantageous positional fixing, is ensured to the full extent after the winding process. With other known types of insulation for subwindings of the winding system 13 a shift in the insulation can take place under the influence of tensile stresses during the winding process and therefore an impairment of the insulating properties may result. This disadvantage is circumvented by the positional fixing of the guide element 23 or 24.

The auxiliary winding body 16 permits a largely uniform winding of the guide elements 23 and 24 with the individual turns of the electrical conductor 12. The dimensions of a subwinding 26 produced in this way and shown in FIG. 7 can be preset in advance via a corresponding dimensioning of the auxiliary winding body 16 and the guide element 23 or 24. In particular, effective utilization of space primarily in the radial direction is achieved thereby. In other winding processes which operate without the auxiliary winding body 16 and the guide elements 23 or 24, the resulting subwindings extend more in the axial and less in the radial direction. This results in an axially longer overall design. In contrast, the electrical machine 1 which is wound with the favorable winding process and using the favorable guide elements 23 and 24 is characterized by clearly improved utilization of space and therefore a shorter axial extent. The favorable winding process and the favorable guide elements 23 and 24 can in this case either be used in combination or else as an individual measure, i.e. either the winding process or the guide elements 23 and 24.

In addition, the thus resulting winding system 13 bears very tightly against the basic body 2 even in the region of the end sides 5 and 6, in which winding heads (not illustrated in any more detail) are formed, with the result that good thermal coupling is provided. This has a favorable effect on the dissipation of the heat produced in the electrical conductors 12 in the region of the winding heads, via the stator laminate stack of the basic body 2.

Figure 7:
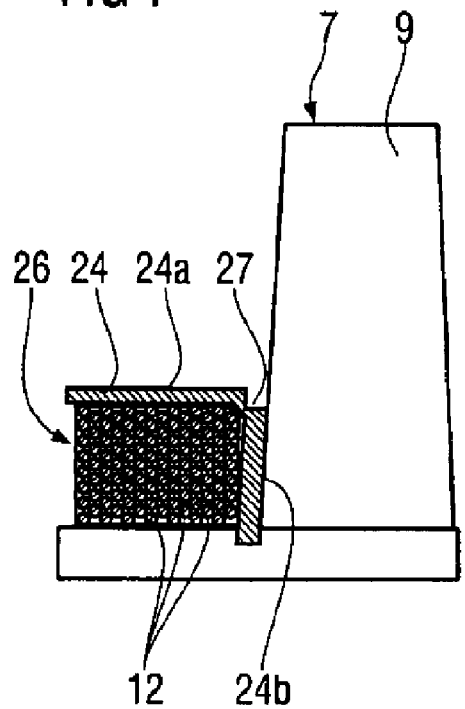
FIG. 7 shows the guide element shown in FIG. 6 in the wound state.
Figure 8:
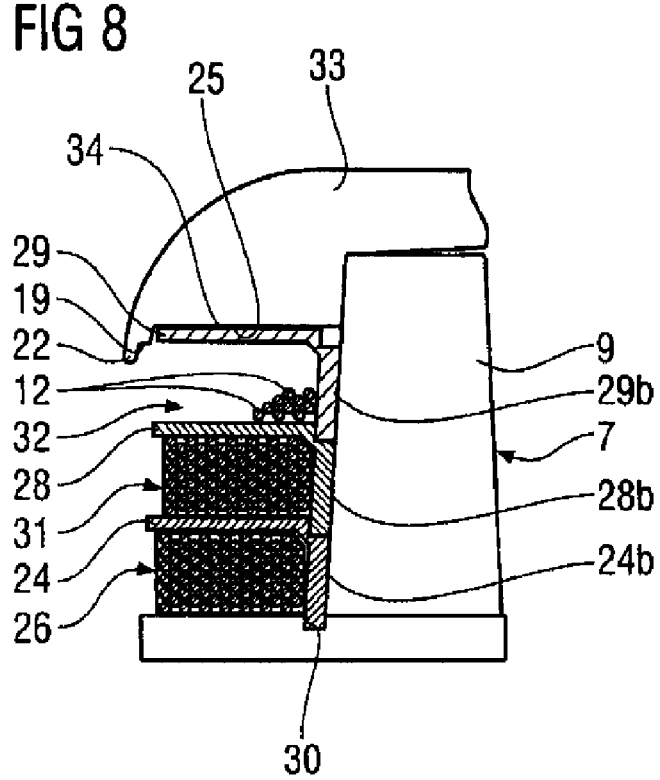
FIG. 8 shows an exemplary embodiment of two already wound guide elements shown in FIG. 6 and a third guide element as shown in FIG. 6 which is yet to be wound as well as an auxiliary winding body, which is positioned on the end plate shown in FIG. 1 during a third subwinding process.

As shown in the illustration in FIG. 7, the L-profiled guide element 24 has a cutout 27 in the outer region of the bending edge between the L limb 24a and the L base 24b, into which cutout an L base 28b of a further L-profiled guide element 28 can engage. Thus, a positionally fixed construction of a plurality of guide elements 24 and 28 which is stacked in the axial direction can be realized. By way of example, FIG. 8 shows an embodiment with three guide elements 24, 28 and 29 stacked adjacent to one another. In this case, the L bases 28b and 29b of the guide elements 28 and 29, respectively, are fixed in the cutout 27 of the guide element 24 and 28, respectively, lying therebeneath and the L base 24b of the lowermost guide element 24 is fixed in a similarly designed cutout 30 of the end plate 7.

The exemplary embodiment shown in FIG. 8 shows a state in which the guide elements 24 and 28 have already been wound completely with the subwinding 26 or with a subwinding 31. In contrast, the third guide element 29 is just being wound with the electrical conductors 12 of a further subwinding 32.

The guidance of the electrical conductors 12 takes place by means of an auxiliary winding body 33, which is positioned onto the separating webs 9 of the end plate 7. In contrast to the auxiliary winding body 16, however, its engage-over width is matched to the longer dimension in the axial direction of the stack construction comprising the three guide elements 24, 28 and 29. In addition, the bearing face 25 for the third guide element 29 is formed by means of a depression 34 on the underside 19 of the auxiliary winding body 33. This results in very effective positional fixing of the third guide element 29.

Figure 9:
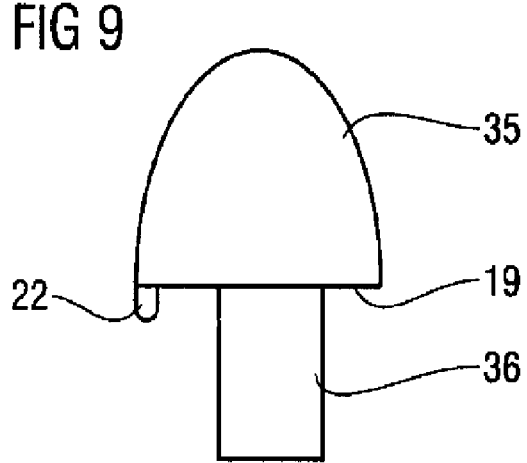
FIG. 9 shows an exemplary embodiment of an auxiliary winding body with a fastening protrusion on its underside.

FIG. 9 illustrates a further exemplary embodiment of an auxiliary winding body 35. In contrast to the auxiliary winding bodies 16 and 33, the auxiliary winding body 35 has, on its underside 19, instead of the fastening apertures 20 at least one fastening protrusion 36, which extends axially downwards away from the underside 19 and is used for engaging in one of the slots 10 of the basic body 2. The auxiliary winding body 35 is therefore plugged in directly at the basic body 2 for the duration of the winding process. An end plate 7 or 8 as in the above-described exemplary embodiments is not required.

Figure 10:
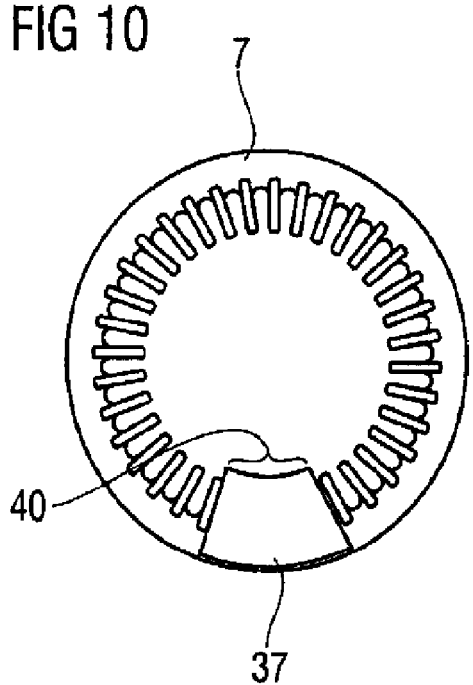
FIGS. 10 to 12 show exemplary embodiments of auxiliary winding bodies with different circular-arc covering.
Figure 11:
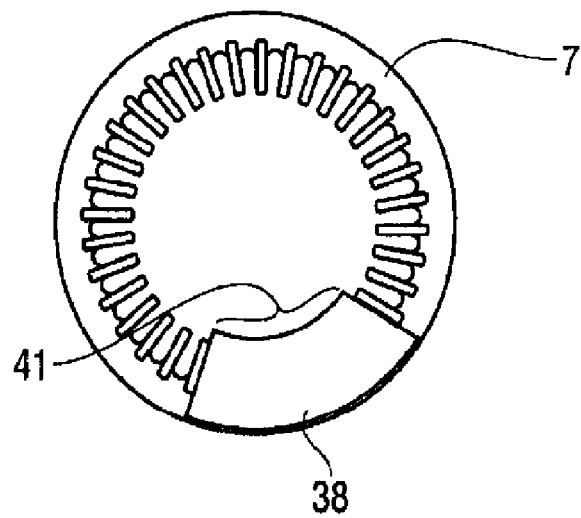
Figure 12:
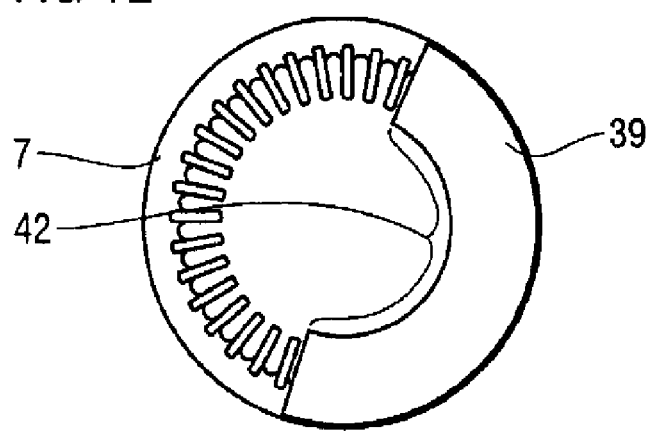

FIGS. 10 to 12 show further exemplary embodiments of auxiliary winding bodies 37, 38 and 39, respectively, which are used in conjunction with the end plate 7 or 8 during the winding process. They differ from one another in terms of the size of the respective covered circular arc segment. The auxiliary winding bodies 37 to 39 are each intended for different embodiments of the electrical machine 1. In particular, winding systems 13 with various pole numbers can therefore be realized. The auxiliary winding bodies 37 to 39 each have a different covering region 40, 41 and 42, respectively. In each case a different number of slot end openings 14 is covered and bridged for the purpose of guiding the electrical conductor 12. The guide elements which are also used but are not shown in FIGS. 10 to 12 cover the same circular arc segment as the auxiliary winding bodies 37 to 39.

Owing to the use of the auxiliary winding bodies 16, 33, 35, 37, 38 or 39 and in particular also the guide elements 23, 24, 28 or 29, precise shaping of the winding system 13 in the region of the end sides 5 and 6, i.e. precise shaping of the winding heads, is achieved. In particular, it is possible in this way for winding heads with a comparatively large radial and short axial dimension to be realized. In particular, the radial space up to the outer circumference of the basic body 2 is virtually completely used. Owing to this good utilization of space in the radial direction, the shortening in the axial direction results, with the result that other components of the electrical machine 1 such as the housing and/or the mounting plates, for example, can also be designed to be axially shortened. This results in a reduction in the use of materials. In addition, the electrical operational data of the electrical machine are improved. For example, the efficiency is increased as a result of lower copper losses.

In addition, the use of the auxiliary winding bodies 16, 33, 35, 37, 38 or 39 and in particular also of the guide elements 23, 24, 28 or 29 permits a comparable configuration of the various subwindings 26, 31 and 32 of the winding system 13. In particular, these subwindings 26, 31 and 32 have a virtually identical or at least very similar mean coil length and a substantially identical electrical resistance.

What is claimed is:

1. An electrical machine, comprising:
   a basic body having opposite axial end sides and including slots, wherein the slots on the end sides have each a slot end opening;
   a winding system having electrical conductors accommodated in the slots, wherein the electrical conductors extend out on one of the end sides of at least one of the slot end openings, wherein the electrical conductors are laid within a bridging region which extends in a circumferential direction on the at least one end side, and wherein the electrical conductors are inserted into at least one other one of the slot end openings;
   a first guide element, arranged on the at least one end side in the bridging region, for guiding the electrical conductors of a first subwinding of the winding system; and
   an end plate arranged on the at least one end side and having at least one axially protruding separating element, with the first guide element having a base bearing against the separating element.

2. The electrical machine of claim 1, wherein the first guide element has a U profile.

3. The electrical machine of claim 1, wherein the first guide element has an L profile.

4. The electrical machine of claim 1, wherein the first guide element extends in the circumferential direction and has the form of a circular arc segment.

5. The electrical machine of claim 1, further comprising a second guide element for guiding the electrical conductors of a further subwinding of the winding system, said second guide element being arranged axially adjacent to the first guide element.

6. The electrical machine of claim 5, wherein the first and second guide elements are designed to be stackable.

7. The electrical machine of claim 1, wherein the first guide element has a limb and a base, which abut one another at a bending edge, with a cutout extending along the bending edge in an outer region facing away from the electrical conductors.

8. The electrical machine of claim 1, wherein the first guide element is designed to be electrically insulating.

9. The electrical machine of claim 1, wherein the first guide element is made from a plastic material.

* * * * *